United States Patent [19]
Preiss

[11] Patent Number: 4,608,227
[45] Date of Patent: Aug. 26, 1986

[54] SINTERED TITANIUM HORSESHOES

[76] Inventor: Mildred Preiss, 6 Nassau Dr., Great Neck, N.Y. 11021

[21] Appl. No.: 773,638

[22] Filed: Sep. 9, 1985

[51] Int. Cl.$^4$ .................................................. B22F 1/00
[52] U.S. Cl. .......................................... 419/23; 419/2; 419/30; 419/33; 419/34; 419/36; 419/39; 419/60; 59/58; 59/61; 148/11.5 R; 148/11.5 F; 148/126.1; 148/133; 148/421
[58] Field of Search .................... 59/58, 61; 419/2, 3, 419/23, 30, 36, 33, 34, 60; 148/11.5 R, 11.5 F, 126.1, 133, 421

[56] References Cited

U.S. PATENT DOCUMENTS

| | | | |
|---|---|---|---|
| 3,874,165 | 4/1975 | Dawson | 59/61 |
| 4,484,438 | 11/1984 | Griffith | 59/61 |

*Primary Examiner*—Stephen J. Lechert, Jr.
*Attorney, Agent, or Firm*—Michael I. Kroll

[57] ABSTRACT

A process is provided for the preparation and fabrication of sintered titanium horseshoes whereby titanium powder is processed so that its characteristics are such that it is ideally suited for horseshoes.

The sintered powder titanium horseshoes have many advantages over the present state of the art some of their advantages being that they are light weight, have high strength, are flexible, have excellent wearing characteristics, are abrasion resistant and are easily formed and shaped into the desired configuration.

5 Claims, 2 Drawing Figures

SINTERED TITANIUM HORSESHOES

BACKGROUND OF THE INVENTION

1. Field of the Invention

The instant invention relates generally to the materials and process for fabricating horseshoes and specifically said invention relates to fabricating horseshoes from sintered titanium powder.

2. Description of the Prior Art

Horseshoes have been in existance for hundreds if not thousands of years and from their inception efforts have been made to produce an efficient horseshoe. All of the heretofor types of horseshoes have specific drawbacks which are substantially overcome by the instant invention.

Importantly prior to the instant invention steel horseshoes were extensively used their drawbacks being their excessive weight as compared to the instant invention

SUMMARY OF THE INVENTION

The instant invention consists of the construction of horseshoes from sintered powder titanium which to date has not been successfully perfected and it is the primary object of the instant invention to set forth a new and unique process whereby horseshoes may be successfully made by using sintered titanium powder.

Accordingly it is an object of this invention to provide a cost efficient horseshoe made from sintered titanium powder.

It is a further object of this invention to produce a horseshoe with an absolutely minimum waste of material as may be easily accomplished by using powder metallurgy.

Another object of the instant invention is to eliminate expensive tooling as is the case herein.

A still further object of the instant invention, and a most important object, is to produce a horseshoe that is extremely maleable so that it easily conforms to the natural contour of a horse's hoof, said hoof being generally but not completely or perfectly flat and the prior art can not approach the aforementioned advantage of the instant invention.

Another object of the instant invention is to provide a titanium horseshoe that is consistant and uniform in shape, strength and other important properties required for horseshoes.

A still further object of the instant invention is to provide a light weight horseshoe that is as light as aluminum and as strong as steel.

Accordingly the instant invention has the desirable features of:
  a. light weight
  b. high strength
  c. flexibility
  d. excellent wearing qualities
  e. abrasion resistant
  f. workability
  g. formability Further objects of the instant invention of sintered titanium powder horseshoes will become apparent hereinafter.

DESCRIPTION OF THE PREFERRED EMBODIMENT

Figure 1:
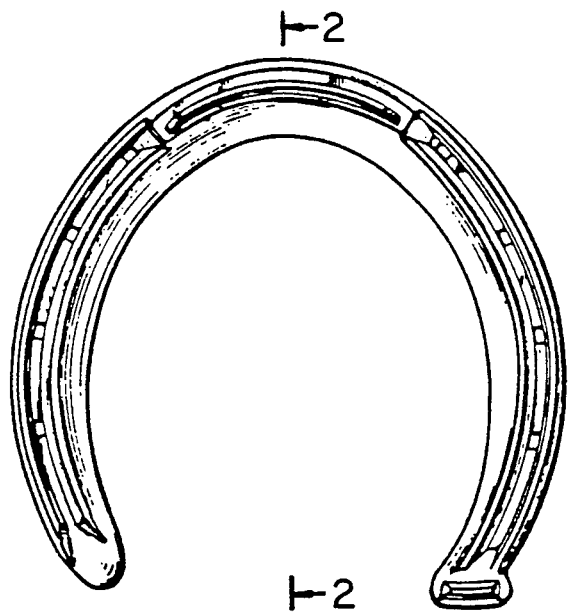
FIG. 1 of the drawings is plan view of a horseshoe.
Figure 2:
FIG. 2 of the drawing shows a cross-section of a horseshoe along the lines 2—2.

The present invention consists of a horseshoe as shown in FIG. 1 and FIG. 2 of the drawing and said horseshoe is constructed by powder metallurgy.

The said horseshoe is constructed from titanium, said titanium being a metal resembling silicon, some of the characterists of titanium being as follows:
  Atomic number: 22,
  Atomic weight: 47.90,
  Specific gravity: 4.5,
  Melting point: 1800° Centergrade, 3272° Fahrenheit.

The process for the fabrication of the instant invention of sintered titanium horseshoes is as set forth below.

Preparation of the titanium powder

Titanium bearing sand called Rutile is clorinated to produce titanium tetrachlorid and is purified in several stages and placed into a reactor which has been loaded with either magnesium or sodium. The reactor is sealed and heated to a point where the molten magnesium or sodium reacts with the tetrachloride, producing raw prous titanium called sponge. The titanium sponge is ground and leached, dried and compacted. The titanium powder suitable for powder metal compacting is a by-product of the sponge-grinding step.

The final product will be sponge (ESP) commercially pure titanium powder.

Compacting the titanium powder

After the powder is produced to specification it is compressed into the desired shape, namely a horseshoe. Since metal powder does not behave like a liquid in the die, uneven shrinkage will occur unless the die design is proper, said die cavity being at least two to three times the height of the loose powder. This design will permit sufficient loose power to be contained in the die so that when it is compressed at room temperature the proper amount of metal will be compressed, said compression pressure being between 40 and 50 tons per square inch of surface area. In addition, clearance between the punch and die wall must be controlled, usually closer that 0.001 inch so that there is sufficient allowance for entrapped air to be expelled while at the same time containing the powder. After compression the compressed horseshoe is stripped and it is ready for heat-treatment or sintering said compression being performed at room temperature.

Sintering

In the sintering operation several factors are critical, namely:
  Temperature: 2300° F. to 2800° F.,
  Time: 3 to 4 hours,
  Atmosphere: vacuum,
  Surface lining of furnace: molybdenum or tungsten,
  Cooling: 1 to 4 hours with inert gas (or) furnace cool for up to 24 hours.

Although pure titanium is initially used for the powder the final product has, during fabrication, picked-up certain elements inherent in the process and a chemical analysis of the final sintered horseshoe will be typically as follows:

| Sample | Chemical analysis by % weight | | | | |
| --- | --- | --- | --- | --- | --- |
| | N | C | H | Fe | $O_2$ |
| A | .0150 | .0200 | .0016 | .0400 | .1340 |
| B | .0180 | .0400 | .0047 | .0300 | .1450 |

The final product will be approximately 97% dense as compared to a cast horseshoe and it is this density factor that provides an excellent quality horseshoe.

Annealing is performed on some horseshoes where heat is not used in forming so that the horseshoes may be formed cold said annealing temperature being 1300° F. for two hours and stress relieved at 900°–1000° F. for 45 minutes with air cooling being used.

While the process herein described constitutes the preferred embodiment of the instant invention it is understood that the invention is not limited to this precise process and that changes may be made therein without departing from the scope of this invention.

Having regard to the foregoing disclosure the following is claimed as the patentable embodiments thereof:

1. A process for fabricating horseshoes from titanium powder, which comprises:
   a. preparing sponge (ESP) commercially pure titanium powder;
   b. compacting said titanium powder into a horseshoe shaped cavity with a pressure of between 40 and 50 tons per square inch; and
   c. sintering the compacted titanium powder: in a furnace having a surface lining selected from the group consisting of molybdenum and tungsten as follows and under the following conditions:
      (1) temperature of 2300° F. to 2800° F.;
      (2) time at temperature 3 to 4 hours;
      (3) atmosphere being a vacuum; and
      (4) cooling.

2. A process for fabricating horseshoes from titanium powder, as recited in claim 1, wherein the cooling time is 1 to 4 hours in inert gas.

3. A process for fabricating horseshoes from titanium powder, as recited in claim 1, wherein the cooling is performed in the furnace for 24 hours.

4. A process for fabricating horseshoes from titanium powder, as recited in claim 1, wherein the surface lining of the furnace is tungsten.

5. A process for fabricating horseshoes from titanium powder, comprising the step of annealing so that the horseshoe may be formed cold, the annealing temperature being 1300° F. for two hours and stress relieved to 900°–1000° F. for 45 minutes with air cooling.

* * * * *